C. L. RUEHS.
FOLDABLE CARPENTER'S SQUARE.
APPLICATION FILED MAY 4, 1908.
912,174.
Patented Feb. 9, 1909.
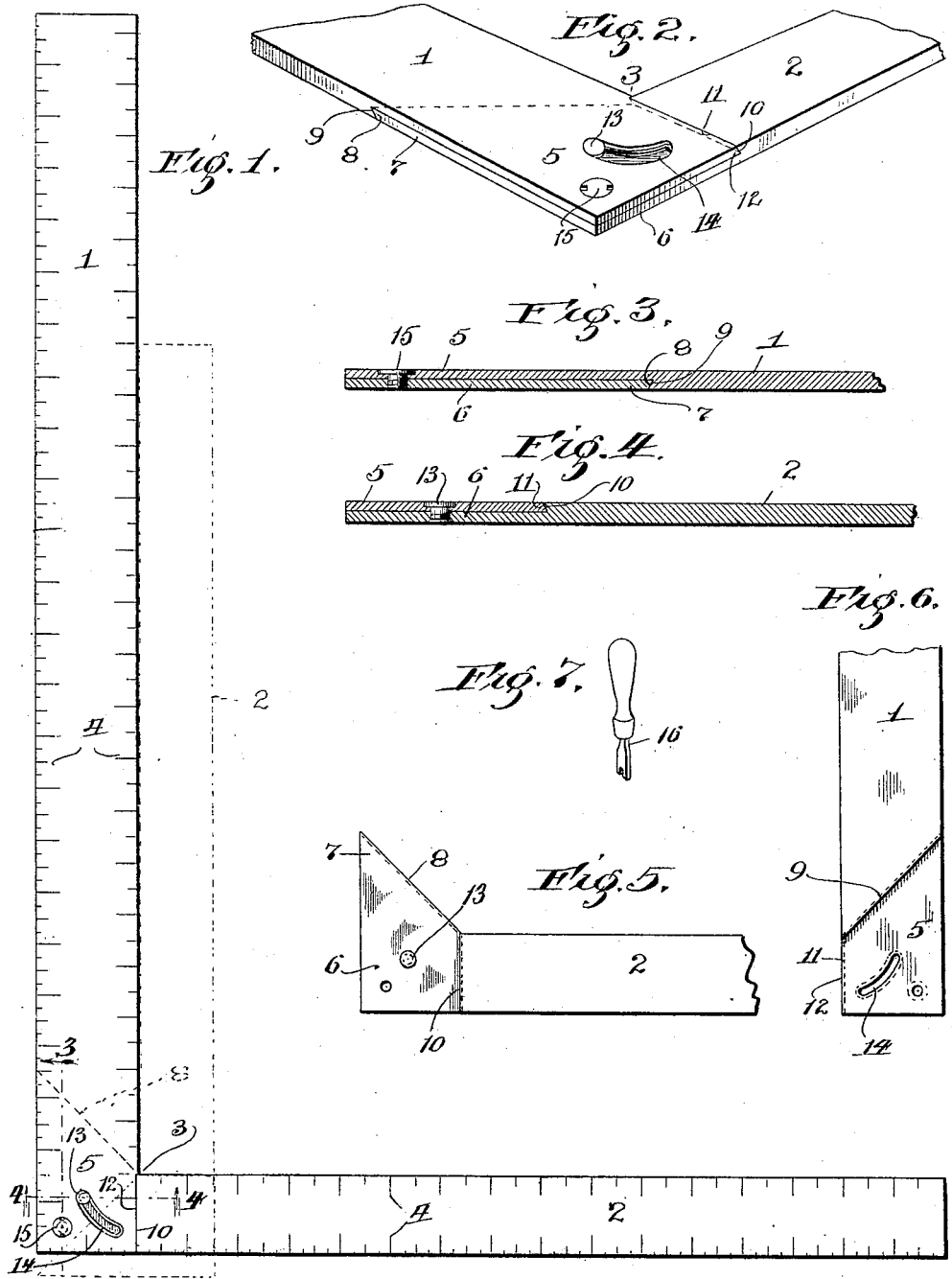

UNITED STATES PATENT OFFICE.

CHARLES L. RUEHS, OF CHICAGO, ILLINOIS, ASSIGNOR OF ONE-THIRD TO CARL J. GEFFERT, ONE-THIRD TO S. O. HAWKINSON, AND ONE-THIRD TO ALFRED ANDERSON, ALL OF CHICAGO, ILLINOIS.

FOLDABLE CARPENTER'S SQUARE.

No. 912,174.　　　Specification of Letters Patent.　　　Patented Feb. 9, 1909.

Application filed May 4, 1908. Serial No. 430,637.

*To all whom it may concern:*

Be it known that I, CHARLES L. RUEHS, a citizen of the United States, and resident of Chicago, in the county of Cook and State of Illinois, have invented certain new and useful Improvements in Foldable Carpenters' Squares, of which the following is a full, clear, and exact description.

This invention relates to improvements in foldable carpenters' squares, and designs to provide an improved mechanism for folding the two arms of a carpenter's square whereby the same may be packed wholly within the ordinary tool chest.

The ordinary carpenter's square is objectionable because one end must necessarily protrude from the tool chest, and it is my purpose to hinge the two arms of the square in a particular manner whereby this objection may be obviated. It is also important that the inner angle between the two arms remain unobstructed and that the sides or surfaces have no projections thereon.

These features have been provided in my improved square and to such end the invention consists in certain novel features of construction, a description of which will be found in the following specification, and the essential features thereof will be particularly pointed out in the claims appended hereto.

The invention is clearly illustrated in the drawings furnished herewith in which—

Figure 1 is a face view of a square embodying my improvements. Fig. 2 is a perspective view of the corner of the square. Fig. 3 is a section taken on the line 3—3, Fig. 1. Fig. 4 is a section on the line 4—4, Fig. 1. Fig. 5 is a face view of a fragment of one of the arms of a square. Fig. 6 is a face view of a fragment of the other arm, and Fig. 7 is a perspective view of a screw-driver.

Referring to these drawings 1, 2, represent the two arms of the square which are joined at the corner 3, and are provided with the scales 4, in the usual manner. The arm 1, has an end portion 5, which overlaps an end portion 6, of the arm 2, and said overlapping end portions are reduced in thickness so that their combined thickness is equal to the thickness of the body of either arm, whereby when the parts are assembled the sides of the arms will be flush with each other. The overlapping end 6, contains an angular extension 7, which is beveled off along its edge 8, to fit in a correspondingly beveled portion 9, formed on the arm 1, of the square, and the edge 10, of the arm 2, is correspondingly beveled off to engage with a beveled edge 11, formed along the edge 12, of the arm 1.

The two arms are hinged together by means of a headed pin 13, secured in the arm 2, which slides in a curved slot 14, formed in the arm 1. The slot is struck from the inner corner formed between the arms 1 and 2 as a center and the pin is countersunk in said slot so as to be flush with the upper surface of the arm. It is quite obvious that the arms may be swung from the inner corner as a center and folded up against each other as shown by the dotted lines in Fig. 1. A countersunk screw 15, extends through an aperture in the arm 1, and is threaded in the arm 2, whereby the two arms may be clamped together against movement. I prefer to make the screw with two small notches in its periphery, and have provided a screw-driver 16, which contains two prongs in its working edge for engagement with said notches in the screw 15, although this particular form of arrangement is not material to my invention.

From the above it will be seen that a perfectly rigid and true corner is formed for the square which contains no projections either into the angle of the square or above the surfaces of the sides of the square. Furthermore, that the dove-tailed, abutting edges aid the pin and screw in holding the two arms in a perfectly rigid manner. By loosening the screw 15, the arm 2, may be swung up against the arm 1, thus bringing the entire square into compact form so that it may be placed wholly within the ordinary carpenter's tool chest.

I am aware that various alterations and modifications of this device are possible without departing from the spirit of my invention, and I do not therefore desire to be limited to the exact form shown and described.

I claim as new and desire to secure by Letters Patent:—

1. A foldable carpenter's square, comprising two arms having overlapping end portions of one half the thickness of the main portions of the arms and fulcrumed upon each other solely by the overlapping end portions which engage the main portions of the arms at the inner angle of the meeting arms, said arms being arranged to extend at right angles to each other, or to be folded up edge to edge, a pin upon one of the overlapping ends running in a curved slot in the other end portion which is struck from the inner angle of the meeting arms as a center, and means for clamping the arms against relative movement.

2. A foldable carpenter's square, comprising two arms arranged to extend at right angles to each other or to be folded up edge to edge, and fulcrumed upon each other at the inner angle of the meeting arms, said arms having overlapping ends and abutting dovetailed edges, one of said overlapping ends having a headed pin traveling in a curved slot in the other end portion, which slot is struck from the inner angle of the meeting arms, and a countersunk screw for securing the two arms against relative movement.

3. A foldable carpenter's square, comprising two arms having overlapping end portions of half the thickness of the main portions of the arms, said arms being arranged to lie at right angles to each other in the same plane or to be folded up edge to edge and fulcrumed upon each other solely by the overlapping end portions which engage the main portions of the arms at the inner angle of the meeting arms, a countersunk headed pin in one end portion adapted to travel in a curved slot in the other end portion, which slot is struck from the inner angle of the meeting arms as a center, and a countersunk screw for securing the two arms against relative movement.

4. A foldable carpenter's square comprising two arms fulcrumed upon each other at the inner angle of the meeting arms, each of which arms has an overlapping end portion and abutting dovetailed edges, a pin upon one end portion and a slot upon the other end portion, which slot is struck from the inner angle of the meeting arms as a center, said pin and slot forming a connection between the two overlapping portions, and a screw connection between said overlapping portions.

5. A foldable carpenter's square, comprising two arms having overlapping end portions connecting their ends, said arms being arranged to extend at right angles to each other and to be folded up edge to edge and fulcrumed upon each other solely by the overlapping end portions which engage the main portions of the arms at the inner angle of the meeting arms, a pin upon one of the overlapping ends running in a curved slot in the other end portion which is struck from the inner angle of the meeting arms as a center and countersunk means for securing the arms against relative movement.

In witness whereof, I have executed the above application this 1st day of May A. D. 1908, at Chicago, county of Cook and State of Illinois.

CHARLES L. RUEHS.

Witnesses:
   CHARLES O. SHERVEY,
   FANNIE F. RICHARDS.